(12) United States Patent
Liu et al.

(10) Patent No.: US 10,982,116 B2
(45) Date of Patent: Apr. 20, 2021

(54) ADHESIVE AND DAMPING FILM

(71) Applicant: 3M INNOVATIVE PROPERTIES COMPANY, St. Paul, MN (US)

(72) Inventors: Richard Y. Liu, Woodbury, MN (US); Roger A. Grisle, Woodbury, MN (US); Benjamin J. Bending, St. Paul, MN (US); Nathaniel I. Lehn, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 55 days.

(21) Appl. No.: 16/094,036

(22) PCT Filed: Apr. 24, 2017

(86) PCT No.: PCT/US2017/029047
§ 371 (c)(1),
(2) Date: Oct. 16, 2018

(87) PCT Pub. No.: WO2017/189389
PCT Pub. Date: Nov. 2, 2017

(65) Prior Publication Data
US 2019/0106603 A1    Apr. 11, 2019

Related U.S. Application Data

(60) Provisional application No. 62/329,609, filed on Apr. 29, 2016.

(51) Int. Cl.
*C09J 7/35* (2018.01)
*C09J 7/26* (2018.01)
(Continued)

(52) U.S. Cl.
CPC . *C09J 7/35* (2018.01); *C09J 7/22* (2018.01); *C09J 7/26* (2018.01); *C09J 153/02* (2013.01);
(Continued)

(58) Field of Classification Search
CPC .. C09J 167/02; C09J 2433/00; C09J 2453/00; C09J 153/02; C09J 2205/114;
(Continued)

(56) References Cited

U.S. PATENT DOCUMENTS 5,278,199 A    1/1994  Ohkawa
6,790,911 B2   9/2004  Perevosnik
(Continued)

FOREIGN PATENT DOCUMENTS

JP     2003268052 A  *  9/2003
WO     WO 97/08261      3/1997
(Continued)

OTHER PUBLICATIONS

Flick (Handbook of Adhesives Raw Materials—Section 8 Resins copyright 1989).*
(Continued)

*Primary Examiner* — Alicia J Sawdon
(74) *Attorney, Agent, or Firm* — Clifton F. Richardson

(57) ABSTRACT

Adhesives including a polyester at 20 to 50 weight percent, a first tackifier at 30 to 60 weight percent, and a first olefin-styrene block copolymer at 5 to 30 weight percent are described. The polyester has a glass transition temperature between −40° C. and −10° C., and the adhesive has a heat activation temperature between 20° C. and 100° C. Damping films including at least one layer of the adhesive and including a foamed layer are described. The foamed layer includes a second olefin-styrene block copolymer at 30 to 80 weight percent and a second tackifier at 15 to 60 weight percent.

20 Claims, 1 Drawing Sheet

(51) Int. Cl.
*C09J 167/02* (2006.01)
*C09J 7/22* (2018.01)
*C09J 153/02* (2006.01)

(52) U.S. Cl.
CPC ....... *C09J 167/02* (2013.01); *C09J 2301/124* (2020.08); *C09J 2301/304* (2020.08); *C09J 2301/312* (2020.08); *C09J 2301/408* (2020.08); *C09J 2301/414* (2020.08); *C09J 2433/00* (2013.01); *C09J 2453/00* (2013.01); *C09J 2467/00* (2013.01)

(58) Field of Classification Search
CPC .... C09J 2467/00; C09J 7/35; C09J 2201/128; C09J 2201/61; C09J 2201/622; C09J 2205/102; C09J 7/22; C09J 7/26
See application file for complete search history.

(56) References Cited

U.S. PATENT DOCUMENTS

| | | | |
|---|---|---|---|
| 8,962,136 B2 | 2/2015 | Takahira | |
| 8,999,503 B2 | 4/2015 | Takahira | |
| 9,096,782 B2 | 8/2015 | Takahira | |
| 2002/0151607 A1* | 10/2002 | Gehlsen | B29C 44/348 521/50 |
| 2003/0113533 A1* | 6/2003 | Husemann | C09J 7/25 428/343 |
| 2004/0260012 A1* | 12/2004 | Krabbenborg | C08J 3/12 524/562 |
| 2007/0027269 A1* | 2/2007 | Stumbe | C08G 63/20 525/445 |
| 2010/0075132 A1 | 3/2010 | Waid | |
| 2012/0208016 A1 | 8/2012 | Takahira | |
| 2012/0208017 A1 | 8/2012 | Yoshie | |
| 2012/0208955 A1 | 8/2012 | Yoshie | |
| 2016/0017193 A1 | 1/2016 | Tanaka | |
| 2019/0241775 A1 | 8/2019 | Keite-Telgenbüscher | |

FOREIGN PATENT DOCUMENTS

| | | |
|---|---|---|
| WO | WO 2015-093526 | 6/2015 |
| WO | WO 2015-148685 | 10/2015 |
| WO | WO 2017-030877 | 2/2017 |

OTHER PUBLICATIONS

International Search Report for PCT International Application No. PCT/US2017/029047, dated Jul. 11, 2017, 3 pages.

* cited by examiner

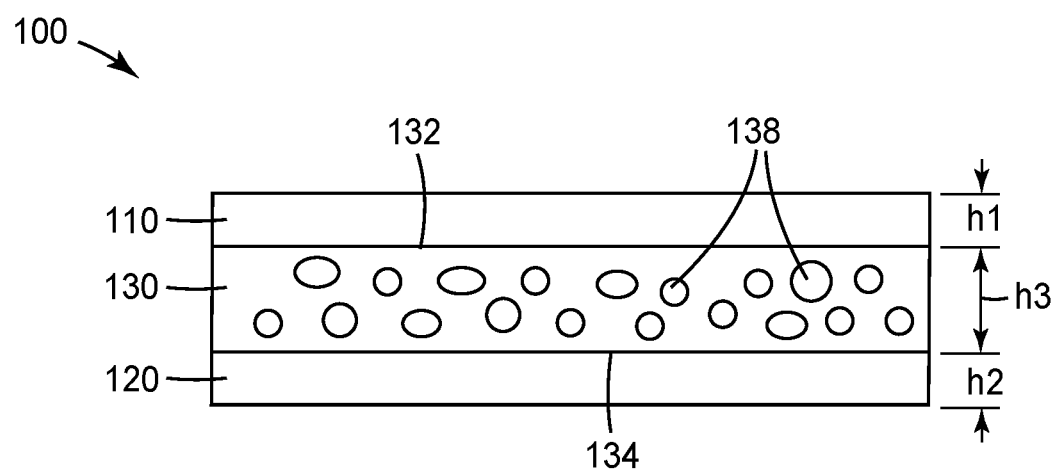

ADHESIVE AND DAMPING FILM

BACKGROUND

Damping tapes are used in a variety of applications to reduce the effects of vibration. For example, damping tapes are used in the assembly of various components of electronic equipment, household appliances, and automobiles in order to dampen vibrations which could result in unwanted noise or damage to the components.

SUMMARY

In some aspects of the present description, an adhesive including a polyester at 20 to 50 weight percent, a first tackifier at 30 to 60 weight percent, and a first olefin-styrene block copolymer at 5 to 30 weight percent is provided. The polyester has a glass transition temperature between −40° C. and −10° C., and the adhesive has a heat activation temperature between 20° C. and 100° C. In some aspects of the present description, a heat-activated damping film including at least one layer of the adhesive and including a foamed layer is provided. The foamed layer includes a second olefin-styrene block copolymer at 30 to 80 weight percent and a second tackifier at 15 to 60 weight percent.

In some aspects of the present description, a heat-activated damping film including a foamed layer, a first low-temperature bonding film disposed on a first major surface of the foamed layer, and a second low-temperature bonding film disposed on a second major surface of the foamed layer opposite the first major surface is provided. Each of the first and second low-temperature bonding films has a heat activation temperature between 20° C. and 100° C. and includes a polyester at 20 to 50 weight percent, a first tackifier at 30 to 60 weight percent, and a first olefin-styrene block copolymer at 5 to 30 weight percent. The polyester has a glass transition temperature between −40° C. and −10° C. The foamed layer includes a second olefin-styrene block copolymer at 30 to 80 weight percent and a second tackifier at 15 to 60 weight percent. The second tackifier has a softening point in a range of 90° C. to 135° C.

BRIEF DESCRIPTION OF THE DRAWINGS

FIG. 1 is a schematic cross-sectional view of a damping film.

DETAILED DESCRIPTION

In various embodiments of the present description, an adhesive, a layer of the adhesive, and a multilayer article (e.g., a damping film or damping tape) including at least one layer of the adhesive and including a foamed layer are provided. According to the present description, it has been found that polyester-based adhesives can have a low heat activation temperature (e.g., 100° C. or less) and when used in a damping film provide both high push-out resistance and high drop resistance performance. Push-out resistance refers to the force required to push apart two plates that are bonded together with the damping film. This can be measured by providing a hole in one of the plates and using a probe to push through the hole to the other plate. Drop resistance performance refers to the ability of the damping film to withstand an impact (e.g., a ball dropped from a specified height) without hydrolocking of the foamed layer (i.e., without the foam cells in the layer collapsing). In some embodiments, the adhesive includes a polyester at 20 to 50 weight percent, a tackifier at 30 to 60 weight percent, and a olefin-styrene block copolymer at 5 to 30 weight percent. The polyester has a glass transition temperature between −40° C. and −10° C., and the adhesive has a heat activation temperature between 20° C. and 100° C. According to the present description, including the olefin-styrene block copolymer in the adhesive has been found to improve the flow of the adhesive in extrusion processes resulting in a more uniform adhesive layer. Including the polyester at 20 to 50 weight percent and the tackifier at 30 to 60 weight percent has been found to give desired adhesion properties when used in a damping film, for example.

In some embodiments, the tackifier has a softening point no less than 140° C. In some embodiments, the tackifier has a softening point of at least 140° C. and less than 190° C., or less than 180° C. In some embodiments, the adhesive includes the tackifier at 35 weight percent or more, and in some embodiments, the adhesive includes the tackifier at 50 weight percent or less. The tackifier may be any suitable compound for increasing the tack or stickiness of the adhesive. Suitable tackifiers include C5 hydrocarbons, C9 hydrocarbons, aliphatic resins, aromatic resins, terpenes, terpenoids, terpene phenolic resins, rosins, rosin esters, and combinations thereof. Suitable tackifiers include ARKON P140 which has a softening point of 140° C. and which is available from Arakawa Europe GnbH, Germany, CLEARON P150 which has a softening point of 150° C. and which is available from Yasuhara Chemical Co., Japan, and ENDEX 160 which has a softening point of 160° C. and which is available from Eastman Chemical Company, Kingsport, Tenn. In some embodiments, the tackifier is a terpene phenol resin such as SP-560 which has a softening point of 155° C. and which is available from SI Group Inc., Schenectady, N.Y.

In some embodiments, the olefin-styrene block copolymer includes styrene blocks at 5 to 50 weight percent, or at 8 to 40 weight percent, or at 10 to 30 weight percent, or at 10 to 20 weight percent. In some embodiments, the olefin-styrene block copolymer comprises olefin blocks selected from the group consisting of ethylene, propylene, isoprene, octane, butylene, and copolymers thereof. In some embodiments, the olefin-styrene block copolymers are linear triblock copolymers with styrene blocks on opposite ends of an olefin block. Suitable olefin-styrene block copolymers include those available from KRATON Performance Polymers Inc., Houston, Tex., such as KRATON D1161 P which is a clear, linear triblock copolymer based on styrene and isoprene with a polystyrene content of 15 percent. Other suitable olefin-styrene block copolymers include diblock copolymers, multiblock copolymers, star-shaped block copolymers, and branched block copolymers.

In some embodiments, the adhesive has a heat activation temperature between 20° C. and 100° C., or between 25° C. and 90° C., or between 30° C. and 80° C. The heat activation temperature is determined, at least in part, by the choice of polyester used in the adhesive. Suitable polyesters are described elsewhere herein.

In some embodiments, an adhesive of the present description is formed into a film to provide a low-temperature bonding film (e.g., a bonding film having a heat activated bonding temperature of 100° C. or less). In some embodiments, the low-temperature bonding film is combined with a foamed layer to provide a heat-activated damping film. The foamed layer may be included to provide a damping effect (e.g., vibration damping) in articles including the heat-activated damping film. In some embodiments, the damping film includes a first low-temperature bonding film on a first major surface of the foamed layer, and in some embodiments, the damping film further includes a second low-temperature bonding film on the opposing second major surface of the foamed layer.

FIG. 1 is a schematic cross-sectional view of heat-activated damping film 100 including first and second low-temperature bonding films 110 and 120 disposed on a foamed layer 130. FIG. 1 is not necessarily to scale. First low-temperature bonding film 110 is disposed on first major surface 132 of foamed layer 130 and second low-temperature bonding film 120 is disposed on second major surface 134 opposite the first major surface 132. Each of the first and second low-temperature bonding films has a heat activation temperature between 20° C. and 100° C. Each of the first and second low-temperature bonding films may be layers of an adhesive of the present description as described elsewhere herein. Each of the first and second layers 110 and 120 may include a polyester at 20 to 50 weight percent, a first tackifier at 30 to 60 weight percent, and first olefin-styrene block copolymer at 5 to 30 weight percent. The foamed layer 130 includes a plurality of cells 138 which may be filled with air or nitrogen or inert gases. The foamed layer 130 includes a second olefin-styrene block copolymer at 30 to 80 weight percent and a second tackifier at 15 to 60 weight percent. In some embodiments, the second tackifier has a softening point in a range of 90° C. to 135° C.

The heat-activated damping film 100 can be formed by coextruding each of the first and second low-temperature bonding films 110 and 120 and the foamed layer 130. In other embodiments, the foamed layer 130 is formed separately from the first and second low-temperature bonding films 110 and 120 and then the first and second low-temperature bonding films 110 and 120 are laminated to the foamed layer 130 using a roll-to-roll laminator, for example.

The second olefin-styrene block copolymer (the olefin-styrene block copolymer of the foamed layer 130) may be the same as or different from the first olefin-styrene block copolymer (the olefin-styrene block copolymer of the first and second low-temperature bonding films 110 and 120). The first and second olefin-styrene block copolymers may be any of the olefin-styrene block copolymers described elsewhere herein for use in the adhesives of the present description.

In some embodiments, the second tackifier has a softening point lower than that of the first tackifier. The first tackifier can be any of the tackifiers described elsewhere herein for use in the adhesives of the present description. In some embodiments, the second tackifier has a softening point lower than that of the first tackifier. For example, in some embodiments, the first tackifier has a softening point of at least 140° C., while the second tackifier has a softening point of no more than 135° C. In some embodiments, the second tackifier has a softening point in a range of 90° C. to 135° C., or 100° C. to 135° C., or 110° C. to 130° C. The second tackifier may have a composition similar to the first tackifier but may have a different molecular weight. The second tackifier may be selected from the group consisting of C5 hydrocarbons, C9 hydrocarbons, aliphatic resins, aromatic resins, terpenes, terpenoids, terpene phenolic resins, rosins, rosin esters, and combinations thereof. Suitable tackifiers for use as the second tackifier include CUMAR 130, which has a softening point of 130° C. and which is available from Neville Chemical Company, Pittsburgh, Pa., and HIKOTACK C-95 and HIKOTACK C-120, which have a softening point of 95° C. and 120° C., respectively, and which are available from Kolon Industries, South Korea.

Either of the first and second tackifiers can be a mixture of two or more tackifier compounds selected to give the mixture the desired softening point. The softening point for a mixture can be estimated by interpolation of softening points for the individual tackifier compounds. In some embodiments, the second tackifier is a mixture of two or more tackifier compounds and the mixture has a softening point in a range of 90° C. to 135° C., or in a range of 100° C. to 135° C., or in a range of 110° C. to 130° C. Tackifiers suitable for use in mixtures that can be utilized as the first or second tackifier include mixtures of the tackifiers described elsewhere herein. Tackifiers suitable for use as the first or second tackifier include the hydrocarbon resin tackifiers and the rosin resin tackifiers available from Eastman Chemical Company, Kingsport, Tenn., and suitable mixtures of these tackifiers.

As used herein, the softening point of a tackifier, or of a mixture of tackifier compounds, is the softening point as determined using a ring and ball softening test. Unless indicated differently, the ring and ball softening test is the test method specified in the ASTM E28-14 test standard.

In some embodiments, the foamed layer is made by including a foaming agent in the composition used to form the foamed layer 130. The foaming agent may include one or more of a surfactant, a chemical foaming agent, a blowing agent or any agent that can form gas in the layer. In some embodiments, the foaming agent is included in the composition at 0.5 to 6.0 weight percent. Suitable foaming agents include azodicarbonamide, sodium bicarbonate, citric acid, and ECOCELL-P which is available from Polyfil Corporation, Rockaway, N.J. In alternative embodiments, the plurality of cells 138 in the foamed layer 130 are formed by direct injection of gas into a composition which is extruded to form the foamed layer 130.

In some embodiments, the foamed layer 130 has a density substantially lower than the density of the polymers utilized in the foamed layer 130. For example, the polymers of the foamed layer 130 may have a density of about 1.2 g/cc and the foamed layer 130 may have a density below 1.0 g/cc. In some embodiments, the foamed layer 130 has a density in a range of 0.5 to 0.9 g/cc, or in a range of 0.55 to 0.85 g/cc, or in a range of 0.6 to 0.8 g/cc. In some embodiments, plurality of cells 138 have an average (arithmetic average over all cells) cell size between 5 micrometers and 100 micrometers, or between 5 micrometers and 75 micrometers, or between 5 micrometers and 50 micrometers, or between 5 micrometers and 30 micrometers, or between 10 micrometers and 30 micrometers. The cell size is the largest dimension (e.g., diameter) of the cell. In some embodiments, the foamed layer 130 has a porosity (percent voided volume or percent volume containing a gas phase) in a range of 5 to 50 percent, or in a range of 10 to 40 percent. The plurality of cells 138 may be spherical, elliptical, or irregular shaped, for example. The plurality of cells 138 may be distributed substantially randomly and/or substantially uniformly in the foamed layer 130. The cells may be described as being substantially uniformly distributed if, for example, each spherical region in the interior of the foamed layer 130 having a diameter of 5 times the average cell size has an approximately same number of cells in the region. In some embodiments, at least a majority of the cells 138 are closed cells. In some embodiments, at least 50 percent, or at least 75 percent, or at least 90 percent, or substantially all of the cells 138 are closed cells.

The first layer 110 has a thickness h1, the second layer 120 has a thickness h2, and the foamed layer 130 has a thickness h3. In some embodiments, each of h1 and h2 is in a range of 0.05 to 1, or 0.1 to 0.5, or 0.12 to 0.35 times the thickness h3. In some embodiments, the thickness h3 of the foamed layer 130 is in a range of 30 micrometers to 1000 micrometers, or in a range of 40 micrometers to 500 micrometers, or in a range of 50 micrometers to 200 micrometers.

Polyesters suitable for use in the adhesives of the present description include those described in U.S. Pat. App. No. 62/206,618 filed Aug. 18, 2015, which is hereby incorporated by reference herein to the extent that it does not contradict the present description. In some embodiments, the polyester has a glass transition temperature between −40° C. and −10° C. In some embodiments, the polyester has a glass transition temperature less than −20° C. As used herein, unless specified differently, the glass transition temperature refers to the glass transition temperature as determined using differential scanning calorimetry (DSC).

In some embodiments, the polyester includes at least one crosslinkable moiety, each including at least one crosslinkable pendent group, where a ratio of a total number of the at least one crosslinkable pendent groups to a total number of ester groups in the polyester is in a range of 0.0001 to 0.5. In some embodiments, the polyester includes at least one crosslinkable moiety, each including at least one crosslinkable pendent group, where a ratio of a total number of the at least one crosslinkable moiety to a total number of ester groups in the polyester is in a range of 0.0001 to 0.5. In some embodiments, the polyester includes the reaction product of reactive precursors. The reactive precursors include at least one diacid or diester, at least one diol not containing a crosslinkable pendent group, and at least one monomer containing at least one crosslinkable pendent group. A ratio of the number of molecules of the at least one monomer to a sum of the number of molecules of the at least one diacid or diester and the number of molecules at least one diol is in a range of 0.0001 to 0.5.

Polyesters may be formed as the reaction product of diacids and diols. For example, terephthalic acid (a diacid) and ethylene glycol (a diol) can be reacted to form polyethylene terephthalate (PET). Polyester can be chain-extended or cross-linked in a solution phase reaction by utilizing a di-functional or a multifunctional isocyanate as a chain extending or crosslinking agent. In some cases, the resulting chain-extended or cross-linked polyester compositions can be used as adhesives but such adhesives typically exhibit poor shear strength.

Polyesters useful for use in the adhesives of the present description may include one or more moieties which are crosslinkable by virtue of having crosslinkable pendent groups. The crosslinkable pendent groups may include one or more reactive unsaturated carbon-carbon bonds, e.g., alkene or alkyne, which could undergo efficient radical-based addition or propagation reactions. In some embodiments, the crosslinkable pendent group includes terminal alkene, substituted alkene, allyl, alkyne, cyclic alkene, (meth)acrylate or other reactive groups. In some embodiments, the crosslinkable pendent groups include a carbon-carbon double bond (—C═C—). The polyesters may be crosslinkable by the application of actinic radiation (e.g., ultraviolet radiation or electron beam radiation) and/or may be crosslinkable by the application of heat (thermal-induced crosslinking). The adhesives of the present description offer advantages over other polyester containing adhesives. For example, in some embodiments, the polyesters used in the adhesives can be crosslinked with high efficiency and without low molecular weight monomer additives.

In some embodiments, a ratio of a total number of the at least one crosslinkable pendent groups in the polyester to a total number of ester groups in the polyester is in a range of 0.0001 to 0.5, or in a range of 0.001 to 0.2, or in a range of 0.001 to 0.1. In some embodiments, a ratio of a total number of the at least one crosslinkable moiety to a total number of ester groups in the polyester is in a range of 0.0001 to 0.5, or in a range of 0.001 to 0.2, or in a range of 0.001 to 0.1.

In some embodiments, the polyester is made by reacting precursors that include at least one diacid, at least one diol not containing a crosslinkable pendent group, and at least one monomer containing a crosslinkable pendent group. In some embodiments, the at least one diacid includes at least two diacids and in some embodiments, the at least one diol not containing a crosslinkable pendent group includes at least two diols. A pendent group may refer to a side group attached to a backbone chain of a polymer. A monomer may be said to contain a pendent group if it contains a group which becomes a side group upon polymerization. A ratio of the number of molecules of the at least one monomer to a sum of the number of molecules of the at least one diacid and the number of molecules at least one diol is in a range of 0.0001 to 0.5, or in a range of 0.001 to 0.2, or in a range of 0.001 to 0.1. In some embodiments, a ratio of the number of molecules of the at least one diacid to the number of molecules of the at least one diol is in a range of 0.85 to 1.15, or 0.9 to 1.1. In some embodiments, the at least one monomer containing a crosslinkable pendent group may be an alkene- or alkyne-containing diacid or diol or diester. It will be understood that polyesters used in the adhesives of the present description can be alternatively made by substituting diesters for diacids in the reactive precursors.

Each moiety containing a crosslinkable pendent group may include a carbon-carbon double bond and in some embodiments may be represented by the general Formula 1 below:

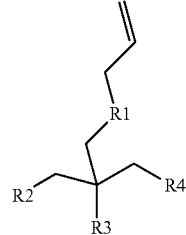

Formula 1 where

R1 is —O—, —(CH2)n-, —COO—, —OCO—, —OOC—, —S—, —(C═O)— or their combinations;

R2 is —OH, —COOH or —R2'-, wherein —R2'- is —O—, —COO—, —(CH2)n-, —(C═O)—, —S—, or combinations thereof; R3 is —H, —CH3, —OH, —CH2OH, —(CH2)m-CH3, —SO3Na, —COONa, or combinations thereof; and R4 is —O—, —COO—, —(CH2)p-, —(C═O)—, —S— or combinations thereof.

Here, n, m and p are integers greater than 0. For example, n, m and p may each be independently in the range of 1 to 100. In some embodiments, an end group of the polyester may comprise the moiety (e.g., R2 may be —COOH, or —OH). In some embodiments the moiety may be represented by the Formula 2 below:

Formula 2

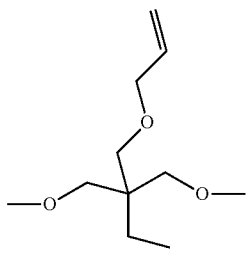

In some embodiments, the polyester may be made by reacting precursors that include at least one diacid, at least one diol not containing a crosslinkable pendent group, and a monomer which forms the moiety. In some embodiments, the monomer may be selected to give a moiety represented by the general Formula 1 above. In some embodiments, the monomer is trimethylolpropane monoallyl ether (TMPME) which can form the moiety represented by Formula 2. In other exemplary embodiments, monomers represented by any of Formulas 3 to 5 may be chosen.

Formula 3

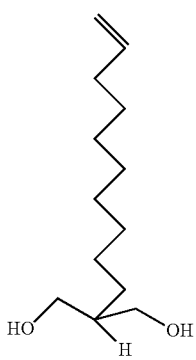

Formula 4

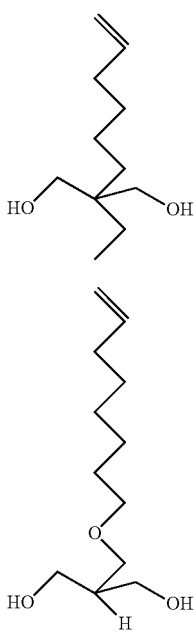

Formula 5

In still other embodiments, monomers represented by any of the Formulas 3 to 5 with the —OH groups replaced by —COOH groups (or alternatively by ester groups) may be used. In some embodiments, the pendent groups of the moiety generating monomer have at least 3 functionalities, among which 2 of them are either —OH or —COOH terminated while the third one is neither —OH nor —COOH. The third pendent functional group may be terminated by a —C═C bond. Other suitable possibilities are provided in Formula 1. Further possibilities for the crosslinkable pendent groups are provided in Formulas 6 to 9 where R represents a constituent of the backbone of the polyester.

Formula 6

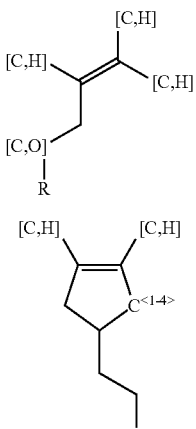

Formula 7

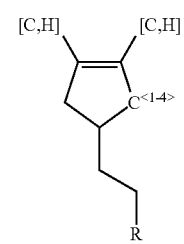

Formula 8

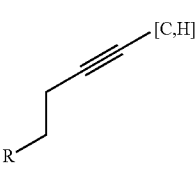

Formula 9

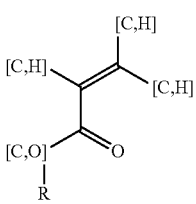

In some embodiments, the polyesters are formed by reacting precursors (e.g., in an esterification reaction) that include at least one acid (e.g., a diacid such as a dicarboxylic acid or a polyacid such as a polycarboxylic acid), at least one alcohol (e.g., a diol or a polyol), and at least one monomer containing at least one crosslinkable pendent group. Examples of suitable acids include terephthalic acid (e.g., 1,4 terephthalic acid), 1,4 naphthalic acid, isophthalic acid, phthalic acid, 2,6-naphthalenedicarboxylic acid, diphenyl-dicarboxylic acid, succinic acid, adipic acid, azelaic acid, sebacic acid, dodecanedionic acid, 1,4-cyclohexanedicarboxylic acid, and combinations thereof. Examples of suitable alcohols include ethylene glycol, diethylene glycol, triethylene glycol, polyethylene glycol, propylene glycol, dipropylene glycol, polypropylene glycol, 1,3-butanediol, 1,4-butanediol, 1,6-hexane diol, neopentyl glycol, and combinations thereof. Suitable monomers containing at least one crosslinkable pendent group include those selected to give a moiety represented by the general Formula 1 above. In some embodiments, the at least one monomer containing at least one crosslinkable pendent group may be a diol monomer, a diacid monomer, or a combination thereof.

In some embodiments, the polyesters are formed by reacting precursors that include at least one diacid, at least one diol, and at least one monomer containing a crosslinkable pendent group. The reaction between the diols, the diacids and the monomers containing the pendent group may be catalyzed by tetrabutyl titanate, cobalt acetate, zinc acetate, antimony triacetate, and/or other metal acetates. Stabilizers such as triethyl phosphonoacetate may be included to stabilize the catalyst after the reaction. Branching agents such as trimethylol propane may also be used in the reaction.

The adhesives of the present description may include the polyester without crosslinking the polyester. However, the properties of the adhesive (e.g., modulus, bond strength, etc.) may be improved by crosslinking (curing) the polyester, which can be done by applying actinic radiation to the polyester or to an adhesive including the polyester as a component.

In some embodiments, the polyesters prior to curing (crosslinking) have a shear modulus at 1 Hz and 23° C. that is less than 1 MPa, or less than 0.5 MPa, or less than 0.3 MPa. The shear modulus refers to the real part of the complex shear modulus, which may be denoted G' (G prime) based on Dynamic Mechanical Analysis (DMA), unless specified differently. A tan δ value may also be determined by DMA. Unless specified differently, tan δ values specified herein refer to the tan δ value determined by DMA.

In some embodiments, the polyesters have a weight-averaged molecular weight (Mw) of at least 60,000 g/mol, or at least 80,000 g/mol, or at least 100,000 g/mol. The weight-averaged molecular weight (Mw) refers the Mw value determined using gel permeation chromatography (GPC) unless specified differently.

The crystallinity of the polyesters can be determined using DSC. In some embodiments, the polyesters have a crystallinity corresponding to a melting endotherm of less than 20 J/g, or less than 10 J/g, or less than 5 J/g, or substantially zero. The crystallinity may be said to be substantially zero if a statistically meaningful non-zero value of the melting endotherm cannot be measured using standard DSC techniques. In some embodiments, the polyester will not crystallize and so the polyester does not have a melting point.

In some embodiments, the polyesters after curing (e.g., crosslinking via applying actinic radiation) have a shear modulus at 1 Hz and 23° C. that is less than 300,000 Pa, or less than 200,000 Pa. In some embodiments, the polyesters after curing have a shear modulus at 1 Hz and 70° C. that is at least 20,000 Pa. In some embodiments, the polyesters after curing have a shear modulus at 1 Hz and 100° C. that is at least 10,000 Pa In some embodiments, the polyesters after curing have a shear modulus at 1 Hz and 130° C. that is at least 10,000 Pa.

In some embodiments, the polyesters have a tan δ as determined by DMA that is less than 0.7 at 23° C. after curing. In some embodiments, the polyesters have a tan δ less than 0.8 at 70° C. after curing, based on DMA. In some embodiments, the polyesters have a tan δ less than 0.8 at 100° C. after curing, based on DMA. In some embodiments, the polyesters have a tan δ less than 0.8 at 130° C. after curing, based on DMA.

EXAMPLES

Test Methods
 Drop Resistance Test
 The drop resistance test was done on Shinyei Technology (Tokyo Japan) Drop Tester (DT-202). The testing specimen was die cut into a rectangle frame of 50 mm×70 mm×2 mm. The specimen was then laminated in between an aluminum plate and a polycarbonate plate. The aluminum plate had a center hole of 5 mm in diameter. The substrates had been cleaned with 3 wipes of isopropyl alcohol to remove surface contamination. The A1 plate had a dimension of 1.6×102× 152 mm and the polycarbonate plate had a dimension of 3.2×74×96 mm. The specimen was bonded to the two substrates at 80 C for adhesive activation while under a pressure of 0.2 MPa for 10 sec. Once the specimen was laminated, the sample was held at room temperature for 24 hours. The prepared sample was then dropped at 3 heights, 1.0 meter, 1.2 meter, and 2.0 meter. At each height, a maximum number of 30 drops were carried out to a total of 90 drops before ending the testing. If the laminated sample fell apart in any of the drops, the number of drops to failure is reported. Two specimens were tested for each construction and the average of the total number of drops to failure is reported.
 Push Out Test
 The same specimen preparation was used for preparing the laminate for the Push Out test as for the Drop Resistance Test. For the Push Out test, an MTS tensile testing machine (MTS, Eden Prairie, Minn.) mounted with a probe pin was used for the testing. The laminate was placed on a holding frame such that the laminated assembly is suspended on the edges of the aluminate plate. The polycarbonate plate faced downward and was free of touching the supporting frame. The probe pin was mounted on a force transducer and moving downward from above the mounted assembly. The probe pin was aligned with the center hole of the aluminum plate so the pin would start pushing the polycarbonate plate away from the base aluminum plate upon contact. The speed of the probe pin was set at 0.4 in/min (1.0 cm/min) and the maximum force, in Newtons, for separating the polycarbonate plate from the aluminum plate was recorded. A result of less than 250 N is considered "poor".

Comparative Example C1: Laminated Heat-Activated Damping Film

Making of Polyester Polymer for Adhesive:
The polyester polymer used in the Examples was synthesized as follows: The polyester polymer was synthesized in a 7.6 liter batch reactor with the following raw material charge:
 isophthalic acid (1221 grams),
 sebacic acid (1553 grams),
 ethylene glycol (1003 grams),
 1,6-hexanediol (1288 grams),
 cyclohexanedimethanol (766 grams),
 trimethylolpropane (24.2 grams),
 trimethylolpropane monoallyl ether (63.7 grams),
 triethyl phosphonoacetate (2.0 g), and
 tetrabutyl titanate (2.0 grams).
All reagents are commonly commercially available. Under a pressure of 20 psig, this mixture was heated to 254° C. while removing water (a reaction by-product). After approximately 541 grams of water was removed, the pressure was gradually reduced to about 1 mmHg while heating to 275° C. The condensation reaction by-product, ethylene glycol, was continuously removed until a polymer with an intrinsic viscosity of 1.2 dL/g (as measured in 60/40 wt. % phenol/o-dichlorobenzene at 23° C.) was produced.

The resulting polyester polymer exhibited a glass transition of −28 C by DSC and a Mw of 200 Kg/mol by GPC.

Making of Tackified Polyester Adhesive:

The Polyester Polymer, made as detailed above, was first melted by a 55 gal drum unloader and then subsequently pumped into a twin-screw extruder. Also fed into the same extruder is a terpene phenolic resin tackifier, SP-560 (SI Group, Inc., Schenectady, N.Y.). The feed rates of the two raw materials were 7.5 lbs/hr (3.4 kg/hr) of the polyester and 7.5 lbs/hr (3.4 kg/hr) of the tackifier. The extruder was run at 100 rpm screw speed and the melt temperature was controlled at around 320 F (160 C). A gear pump was used to control the feed rate into a film casting die. The melt curtain was then quenched on a chill roll (controlled at 65 F (18 C)) with a double-coated release liner. The sample was then wound up in a roll format. Line speed as adjusted to get to a target thickness of 2 mil (0.85 mm). Sample rolls were collected.

Making of Micro-Foam Core:

The micro-foam core article was made on a coextrusion line. Two hot melt twin-screw extruders were set up side by side. The combination of a 3 layer ABA feedblock and a cast film die were used. The skin extruder, Extruder A, was fed with the following composition:

43% by weight KRATON D1161 P, a linear triblock copolymer based on styrene and isoprene, with a polystyrene content of 15% (Kraton Performance Polymers, Houston, Tex.)

5% by weight IonPhasE IPE PE 0107M, a static dissipative polymer (IonPhasE Oy, Tempere, Finland)

5% by weight NUCREL 960 Ethylene-Methacrylic Acid Copolymer (DuPont Co., Wilmington, Del.)

17% by weight CUMAR 130 aromatic hydrocarbon resin (Neville Chem. Co., Pittsburgh, Pa.)

27% by weight ARKON P-125 alicyclic saturated hydrogenated hydrocarbon resin (Arakawa Chem. Ind., Ltd., Osaka, Japan)

2% by weight REMAFIN BLACK, 40% black pigment EVA masterbatch (Clariant, Charlotte, N.C.)

1% by weight IRGANOX 1726 multifunctional phenolic antioxidant (BASF Corp., Florham Pk., N.J.).

The melt temperature of the skin extruder was controlled at 350 F (177 C). The screw was run at 150 rpm. A gear pump was used to control the feed rate into the feedblock. The feedblock split the skin PSA melt stream into two and fed them onto the outer surfaces of the core layer. The other extruder, Extruder B, was fed with the following composition:

41% by weight KRATON D1161 P
5% by weight IonPhasE IPE PE 0107M
5% by weight NUCREL 960
17% by weight CUMAR 130
25% by weight ARKON P-125
4% by weight REMAFIN BLACK
1% by weight IRGANOX 1726
2% by weight ECOCELL-P foaming agent (Polyfil Corp., Rockaway, N.J.).

The melt temperature of the core extruder was controlled at 350 F (177 C). The rheological characteristics of the adhesive layers and core layer were closely matched by adjusting their melt temperatures such that their viscosities were within 30% of each other. The die/feedblock temperature was 350 F (177 C). The resulting coextruded ABA articles have good flow properties and rheological match, resulting in uniform foam/adhesive formation and uniform micro-foam structure. The skin to core ratio was controlled by the feeding ratios of the two extruders such that the split was 1:2:1. The multilayer melt stream was then spread out in a cast film die and then quenched on a chill roll with a double-coated release liner. The sample was then wound up in a roll format. Sample rolls of film of 8 mil (0.20 mm) overall thickness were collected.

Lamination Polyester Adhesive and Micro-Foam Core:

The Polyester Adhesive and Micro-Foam Core were brought together through a nip in a roll-to-roll laminator. The lamination conditions were: nip temperature of 80-120 C, nip time of 5-30 seconds and nip pressure of 10-100 Psi (69-689 kPa). The resulting laminate structure was about 12 mil (0.30 mm) thick.

The resulting laminated heat-activated damping film exhibited poor drop resistance and good push out force (Table 1).

Comparative Example C2: Coextruded Multilayer Heat-Activated Damping Film

The film was made on a coextrusion line. Two hot melt twin-screw extruders were set up side by side. The combination of a 3 layer ABA feedblock and a cast film die was used. The skin extruder, Extruder A, was fed with the following composition:

50% by weight Polyester Polymer, made as detailed above,
50% by weight SP-560.

The melt temperature of the skin extruder was controlled at 320 F (160 C). The screw was run at 200 rpm. A gear pump was used to control the feed rate into the feedblock. The feedblock split the skin adhesive melt stream into two and fed them onto the outer surfaces of the core layer. The other extruder, Extruder B, was fed with the following composition:

39% by weight KRATON D1161 P
5% by weight IonPhasE IPE PE 0107M
5% by weight NUCREL 960
17% by weight CUMAR 130
25% by weight ARKON P-125
6% by weight REMAFIN BLACK
1% by weight IRGANOX 1726
2% by weight ECOCELL-P.

The melt temperature of the core extruder was controlled at 350 F (177 C). The rheological characteristics of the adhesive layers and core layer were closely matched by adjusting their melt temperatures such that their viscosities were close to each other. The die/feedblock temperature was 330 F (166 C). The resulting coextruded multilayer article had good flow properties, resulting in uniform foam/adhesive formation and uniform micro-foam structure. The feeding ratio from the two extruders was controlled at 1.0:2.5 (Skin extruder to Core extruder). The multilayer melt stream was then spread out in the cast film die and then quenched on a chill roll with a double-coated release liner. The sample was then wound up in a roll format. Sample rolls of 11 mil (0.28 mm) overall thicknesses were collected.

The resulting coextruded multilayer Heat-activated damping film exhibited poor drop resistance and good push out force (Table 1).

Example 1: Coextruded Multilayer Heat-Activated Damping Film

The film was made on a coextrusion line. Two hot melt twin-screw extruders were set up side by side. The combination of a 3 layer ABA feedblock and a cast film die was used. The skin extruder, Extruder A, was fed with the following composition:

40% by weight Polyester Polymer, made as detailed above,
40% by weight SP-560
15% by weight KRATON D1161 P
5% by weight IonPhasE IPE PE 0107M.

The melt temperature of the skin extruder was controlled at 320 F (160 C). The screw was run at 200 rpm. A gear pump was used to control the feed rate into the feedblock. The feedblock split the skin adhesive melt stream into two and fed them onto the outer surfaces of the core layer. The other extruder, Extruder B, was fed with the following composition:

39% by weight KRATON D1161 P
5% by weight IonPhasE IPE PE 0107M
5% by weight NUCREL 960
17% by weight CUMAR 130
25% by weight ARKON P-125
6% by weight REMAFIN BLACK
1% by weight IRGANOX 1726
2% by weight ECOCELL-P.

The melt temperature of the core extruder was controlled at 350 F (177 C). The rheological characteristics of the adhesive layers and core layer were closely matched by adjusting their melt temperatures such that their viscosities were close to each other. The die/feedblock temperature was 330 F (166 C). The resulting coextruded multilayer article had good flow properties, resulting in uniform foam/adhesive formation and uniform micro-foam structure. The feeding ratio from the two extruders was controlled at 1.0:2.5 (Skin extruder to Core extruder). The multilayer melt stream was then spread out in the cast film die and then quenched on a chill roll with a double-coated release liner. The sample was then wound up in a roll format. Sample rolls of 11 mil (0.28 mm) overall thicknesses were collected.

The resulting coextruded multilayer Heat-activated damping film exhibited excellent drop resistance and good push out force (Table 1).

Example 2: Coextruded Multilayer Heat-Activated Damping Film

The film was made on a coextrusion line. Two hot melt twin-screw extruders were set up side by side. The combination of a 3 layer ABA feedblock and a cast film die was used. The skin extruder, Extruder A, was fed with the following composition:

40% by weight Polyester Polymer, made as detailed above,
40% by weight SP-560
15% by weight KRATON D1161 P
5% by weight IonPhasE IPE PE 0107M.

The melt temperature of the skin extruder was controlled at 320 F (160 C). The screw was run at 200 rpm. A gear pump was used to control the feed rate into the feedblock. The feedblock split the skin adhesive melt stream into two and fed them onto the outer surfaces of the core layer. The other extruder, Extruder B, was fed with the following composition:

39% by weight KRATON D1161 P
5% by weight IonPhasE IPE PE 0107M
5% by weight NUCREL 960
17% by weight CUMAR 130
25% by weight ARKON P-125
6% by weight REMAFIN BLACK
1% by weight IRGANOX 1726
2% by weight ECOCELL-P.

The melt temperature of the core extruder was controlled at 350 F (177 C). The rheological characteristics of the adhesive layers and core layer were closely matched by adjusting their melt temperatures such that their viscosities were close to each other. The die/feedblock temperature was 330 F (166 C). The resulting coextruded multilayer article had good flow properties, resulting in uniform foam/adhesive formation and uniform micro-foam structure. The feeding ratio from the two extruders was controlled at 1.0:1.5 (Skin extruder to Core extruder). The multilayer melt stream was then spread out in the cast film die and then quenched on a chill roll with a double-coated release liner. The sample was then wound up in a roll format. Sample rolls of 11 mil (0.28 mm) overall thicknesses were collected.

The resulting coextruded multilayer Heat-activated damping film exhibited excellent drop resistance and good push out force (Table 1).

TABLE 1

Properties of the Examples

| Example | Push Out Force (N) | Drop Resistance (No. of Drops) |
| --- | --- | --- |
| Comp. Ex. C1 | 537 | 12 |
| Comp. Ex. C2 | 490 | 4 |
| Example 1 | 453 | 45 |
| Example 2 | 523 | 53 |

The following is a list of exemplary embodiments of the present description.

Embodiment 1 is an adhesive comprising:
a polyester at 20 to 50 weight percent, the polyester having a glass transition temperature between −40° C. and −10° C.;
a first tackifier at 30 to 60 weight percent; and
a first olefin-styrene block copolymer at 5 to 30 weight percent,
wherein the adhesive has a heat activation temperature between 20° C. and 100° C.

Embodiment 2 is the adhesive of Embodiment 1, wherein the polyester comprises at least one crosslinkable moiety, each crosslinkable moiety including at least one crosslinkable pendent group, wherein a ratio of a total number of the at least one crosslinkable pendent groups to a total number of ester groups in the polyester is in a range of 0.0001 to 0.5.

Embodiment 3 is the adhesive of Embodiment 2, wherein the ratio of the total number of the at least one crosslinkable pendent groups to the total number of ester groups in the polyester is in a range of 0.001 to 0.1.

Embodiment 4 is the adhesive of Embodiment 1, wherein the polyester comprises at least one crosslinkable moiety, each crosslinkable moiety including at least one crosslinkable pendent group, wherein a ratio of a total number of the at least one crosslinkable moiety to a total number of ester groups in the polyester is in a range of 0.0001 to 0.5.

Embodiment 5 is the adhesive of Embodiment 4, wherein the ratio of the total number of the at least one crosslinkable moiety to the total number of ester groups in the polyester is in a range of 0.001 to 0.1.

Embodiment 6 is the adhesive of Embodiment 1, wherein the polyester comprises the reaction product of reactive precursors, the reactive precursors comprising:
at least one diacid or diester;
at least one diol not containing a crosslinkable pendent group; and at least one monomer containing at least one crosslinkable pendent group;
wherein a ratio of the number of molecules of the at least one monomer to a sum of the number of molecules of the at least one diacid or diester and the number of molecules at least one diol is in a range of 0.0001 to 0.5.

Embodiment 7 is the adhesive of Embodiment 1, wherein the first tackifier has a softening point no less than 140° C.

Embodiment 8 is the adhesive of Embodiment 1, wherein the first tackifier comprises a terpene phenol resin.

Embodiment 9 is the adhesive of Embodiment 1, wherein the glass transition temperature of the polyester is less than −20° C.

Embodiment 10 is the adhesive of Embodiment 1, wherein the polyester has a weight-averaged molecular weight of at least 60 Kg/mol.

Embodiment 11 is the adhesive of Embodiment 1, wherein the polyester has a crystallinity corresponding to a DSC melting endotherm of less than 20 J/g.

Embodiment 12 is the adhesive of Embodiment 11, wherein the crystallinity is less than 5 J/g.

Embodiment 13 is the adhesive of Embodiment 11, wherein the crystallinity is substantially zero.

Embodiment 14 is the adhesive of Embodiment 1, wherein the polyester does not have a melting point.

Embodiment 15 is the adhesive of Embodiment 1, wherein the first olefin-styrene block copolymer comprises styrene blocks at 5 to 50 weight percent.

Embodiment 16 is the adhesive of Embodiment 1, wherein the first olefin-styrene block copolymer comprises styrene blocks at 8 to 40 weight percent.

Embodiment 17 is the adhesive of Embodiment 1, wherein the first olefin-styrene block copolymer comprises styrene blocks at 10 to 20 weight percent.

Embodiment 18 is the adhesive of Embodiment 1, wherein the first olefin-styrene block copolymer comprises olefin blocks, the olefin blocks being selected from the group consisting of ethylene, propylene, isoprene, octane, butylene, and copolymers thereof.

Embodiment 19 is the adhesive of Embodiment 1 comprising the polyester at 30 to 45 weight percent.

Embodiment 20 is the adhesive of Embodiment 1 comprising the first tackifier at 35 to 50 weight percent.

Embodiment 21 is the adhesive of Embodiment 1 comprising the first olefin-styrene copolymer at 10 to 20 weight percent.

Embodiment 22 is the adhesive of Embodiment 1, wherein the heat activation temperature is between 25° C. and 90° C.

Embodiment 23 is the adhesive of Embodiment 1, wherein the heat activation temperature is between 30° C. and 80° C.

Embodiment 24 is a heat-activated damping film comprising:
a foamed layer; and
a first low-temperature bonding film disposed on a first major surface of the foamed layer, the first low-temperature bonding film comprising the adhesive of any of Embodiments 1 to 23.

Embodiment 25 is the damping film of Embodiment 24, further comprising a second low-temperature bonding film disposed on a second major surface of the foamed layer opposite the first major surface.

Embodiment 26 is the damping film of Embodiment 25, wherein the second low-temperature bonding film comprises the adhesive of any of Embodiments 1 to 23.

Embodiment 27 is the damping film of Embodiment 25, wherein the second low-temperature bonding film has a same composition as the first low-temperature bonding film.

Embodiment 28 is the damping film of Embodiment 25, wherein the each of the first and second low-temperature bonding films has a thickness in a range of 0.05 to 1 times a thickness of the foamed layer.

Embodiment 29 is the damping film of Embodiment 25, wherein the each of the first and second low-temperature bonding films has a thickness in a range of 0.1 to 0.5 times a thickness of the foamed layer.

Embodiment 30 is the damping film of Embodiment 25, wherein the each of the first and second low-temperature bonding films has a thickness in a range of 0.12 to 0.35 times a thickness of the foamed layer.

Embodiment 31 is the damping film of Embodiment 24, wherein the foamed layer has a thickness in a range of 30 micrometers to 1000 micrometers.

Embodiment 32 is the damping film of Embodiment 24, wherein the foamed layer has a thickness in a range of 40 micrometers to 500 micrometers.

Embodiment 33 is the damping film of Embodiment 24, wherein the foamed layer has a thickness in a range of 50 micrometers to 200 micrometers.

Embodiment 34 is the damping film of any of Embodiments 24 to 33, wherein the foamed layer comprises a second olefin-styrene block copolymer at 30 to 80 weight percent and a second tackifier at 15 to 60 weight percent, the second tackifier having a softening point in a range of 90° C. to 135° C.

Embodiment 35 is the damping film of Embodiment 34, wherein the first and second olefin-styrene block copolymers are the same.

Embodiment 36 is the damping film of Embodiment 34, wherein the second olefin-styrene block copolymer comprises styrene blocks at 5 to 50 weight percent.

Embodiment 37 is the damping film of Embodiment 34, wherein the second olefin-styrene block copolymer comprises styrene blocks at 8 to 40 weight percent.

Embodiment 38 is the damping film of Embodiment 34, wherein the second olefin-styrene block copolymer comprises styrene blocks at 10 to 20 weight percent.

Embodiment 39 is the damping film of Embodiment 34, wherein the second olefin-styrene block copolymer comprises olefin blocks selected from the group consisting of ethylene, propylene, isoprene, octane, butylene, and copolymers thereof.

Embodiment 40 is the damping film of Embodiment 34, wherein the softening point of the second tackifier is in a range of 100° C. to 135° C.

Embodiment 41 is the damping film of Embodiment 34, wherein the softening point of the second tackifier is in a range of 110° C. to 130° C.

Embodiment 42 is the damping film of Embodiment 34, wherein the second tackifier is selected from the group consisting of C5 hydrocarbons, C9 hydrocarbons, aliphatic resins, aromatic resins, terpenes, terpenoids, terpene phenolic resins, rosins, rosin esters, and combinations thereof.

Embodiment 43 is the damping film of Embodiment 34, wherein the second tackifier is a mixture of two or more tackifier compounds.

Embodiment 44 is the damping film of Embodiment 43, wherein the mixture has a softening point in a range of 100° C. to 135° C.

Embodiment 45 is the damping film of Embodiment 24, wherein the foamed layer has a density in a range of 0.5 to 0.9 g/cc.

Embodiment 46 is the damping film of Embodiment 24, wherein the foamed layer has a density in a range of 0.55 to 0.85 g/cc.

Embodiment 47 is the damping film of Embodiment 24, wherein the foamed layer has a density in a range of 0.6 to 0.8 g/cc.

Embodiment 48 is the damping film of Embodiment 24, wherein the foamed layer comprises a plurality of cells, the plurality of cells having an average cell size between 5 micrometers and 100 micrometers.

Embodiment 49 is the damping film of Embodiment 24, wherein the foamed layer comprises a plurality of cells, the plurality of cells having an average cell size between 5 micrometers and 75 micrometers.

Embodiment 50 is the damping film of Embodiment 24, wherein the foamed layer comprises a plurality of cells, the plurality of cells having an average cell size between 5 micrometers and 50 micrometers.

Embodiment 51 is the damping film of Embodiment 24, wherein the foamed layer has a porosity in a range of 5 to 50 percent.

Embodiment 52 is the damping film of Embodiment 24, wherein the foamed layer has a porosity in a range of 10 to 40 percent.

Embodiment 53 is the damping film of Embodiment 24, wherein the foamed layer comprises a plurality of cells, at least a majority of the cells being closed cells.

Embodiment 54 is a heat-activated damping film comprising:
a foamed layer;
a first low-temperature bonding film disposed on a first major surface of the foamed layer; and
a second low-temperature bonding film disposed on a second major surface of the foamed layer opposite the first major surface,
wherein each of the first and second low-temperature bonding films has a heat activation temperature between 20° C. and 100° C. and comprise:
a polyester at 20 to 50 weight percent, the polyester having a glass transition temperature between −40° C. and −10° C.;
a first tackifier at 30 to 60 weight percent; and
a first olefin-styrene block copolymer at 5 to 30 weight percent, and
wherein the foamed layer comprises a second olefin-styrene block copolymer at 30 to 80 weight percent and a second tackifier at 15 to 60 weight percent, the second tackifier having a softening point in a range of 90° C. to 135° C.

Embodiment 55 is the damping film of Embodiment 54, wherein each of the first and second low-temperature bonding films is a layer of the adhesive of any of Embodiments 1 to 23.

Embodiment 56 is the damping film of Embodiment 54, wherein the first and second olefin-styrene block copolymers are the same.

Embodiment 57 is the damping film of Embodiment 54, wherein the foamed layer is further characterized by any of Embodiments 36 to 53.

Descriptions for elements in FIGURES should be understood to apply equally to corresponding elements in other FIGURES, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An adhesive comprising:
a polyester at 20 to 50 weight percent, the polyester having a glass transition temperature between −40° C. and −10° C., the polyester comprising a reaction product of reactive precursors, the reactive precursors comprising:
at least one diacid or diester;
at least one diol; and
at least one monomer containing at least one crosslinkable pendent group, each monomer of the at least one monomer being an alkene- or alkyne-containing diacid, diol or diester;
a first tackifier at 30 to 60 weight percent; and
a first olefin-styrene block copolymer at 5 to 30 weight percent,
wherein the polyester comprises the at least one crosslinkable pendent group attached to, and distributed along, a backbone of the polyester, and
wherein the adhesive has a heat activation temperature between 20° C. and 100° C.

2. The adhesive of claim 1, wherein a ratio of a total number of the at least one crosslinkable pendent group to a total number of ester groups in the polyester is in a range of 0.0001 to 0.5.

3. The adhesive of claim 1, wherein a ratio of a total number of the at least one crosslinkable pendent group to a total number of ester groups in the polyester is in a range of 0.001 to 0.2.

4. The adhesive of claim 1, wherein a ratio of the number of molecules of the at least one monomer to a sum of the number of molecules of the at least one diacid or diester and the number of molecules at least one diol is in a range of 0.0001 to 0.5.

5. The adhesive of claim 1, wherein the first tackifier has a softening point no less than 140° C.

6. The adhesive of claim 1, wherein the polyester has a weight-averaged molecular weight of at least 60 Kg/mol.

7. The adhesive of claim 1, wherein the polyester has a crystallinity corresponding to a DSC melting endotherm of less than 20 J/g.

8. The adhesive of claim 1, wherein the polyester does not have a melting point.

9. The adhesive of claim 1, wherein the first olefin-styrene block copolymer comprises styrene blocks at 5 to 50 weight percent.

10. The adhesive of claim 1, wherein the first olefin-styrene block copolymer comprises olefin blocks, the olefin blocks being selected from the group consisting of ethylene, propylene, isoprene, octane, butylene, and copolymers thereof.

11. The adhesive of claim 1 comprising the first olefin-styrene copolymer at 10 to 20 weight percent.

12. The adhesive of claim 1, wherein the heat activation temperature is between 25° C. and 90° C.

13. A heat-activated damping film comprising:
a foamed layer; and
a first low-temperature bonding film disposed on a first major surface of the foamed layer, the first low-temperature bonding film comprising the adhesive of claim 1.

14. The damping film of claim 13, further comprising a second low-temperature bonding film disposed on a second major surface of the foamed layer opposite the first major surface.

15. The damping film of claim 14, wherein the each of the first and second low-temperature bonding films has a thickness in a range of 0.12 to 0.35 times a thickness of the foamed layer.

16. The damping film of claim 13, wherein the foamed layer has a density in a range of 0.5 to 0.9 g/cc.

17. The damping film of claim 13, wherein the foamed layer comprises a plurality of cells, the plurality of cells having an average cell size between 5 micrometers and 100 micrometers.

18. The damping film of claim 13, wherein the foamed layer has a porosity in a range of 5 to 50 percent.

19. A heat-activated damping film comprising:
a foamed layer;
a first low-temperature bonding film disposed on a first major surface of the foamed layer; and
a second low-temperature bonding film disposed on a second major surface of the foamed layer opposite the first major surface,
wherein each of the first and second low-temperature bonding films has a heat activation temperature between 20° C. and 100° C. and comprise:
a polyester at 20 to 50 weight percent, the polyester having a glass transition temperature between −40° C. and −10° C., the polyester comprising a reaction product of reactive precursors, the reactive precursors comprising:
at least one diacid or diester;
at least one diol; and
at least one monomer containing at least one crosslinkable pendent group, each monomer of the at least one monomer being an alkene- or alkyne-containing diacid or diol or diester;
a first tackifier at 30 to 60 weight percent; and
a first olefin-styrene block copolymer at 5 to 30 weight percent,
wherein the polyester comprises the at least one crosslinkable pendent group attached to, and distributed along, a backbone of the polyester, and
wherein the foamed layer comprises a second olefin-styrene block copolymer at 30 to 80 weight percent and a second tackifier at 15 to 60 weight percent, the second tackifier having a softening point in a range of 90° C. to 135° C.

20. The adhesive of claim 1, wherein the reactive precursors consist essentially of difunctional reactive precursors.

* * * * *